United States Patent
Hornegger et al.

(10) Patent No.: US 7,508,389 B2
(45) Date of Patent: Mar. 24, 2009

(54) COMPUTER-AIDED SELECTION METHOD FOR A PORTION OF A VOLUME

(75) Inventors: Joachim Hornegger, Möhrendorf (DE); Volkmar Welker, Kirchhain (DE)

(73) Assignee: Siemens Aktiengesellscahft, Munich (DE)

( * ) Notice: Subject to any disclaimer, the term of this patent is extended or adjusted under 35 U.S.C. 154(b) by 153 days.

(21) Appl. No.: 10/528,062

(22) PCT Filed: Sep. 16, 2003

(86) PCT No.: PCT/EP03/10306

§ 371 (c)(1),
(2), (4) Date: Feb. 14, 2006

(87) PCT Pub. No.: WO2004/027641

PCT Pub. Date: Apr. 1, 2004

(65) Prior Publication Data

US 2006/0150124 A1 Jul. 6, 2006

(30) Foreign Application Priority Data

Sep. 16, 2002 (DE) .................. 102 42 922

(51) Int. Cl.
*G06T 15/00* (2006.01)
(52) U.S. Cl. .................. 345/419; 345/420; 345/619; 700/120; 700/162; 715/700
(58) Field of Classification Search .................. 345/419, 345/420, 619, 620; 700/162, 166, 120; 715/700
See application file for complete search history.

(56) References Cited

U.S. PATENT DOCUMENTS

| | | | |
|---|---|---|---|
| 5,596,504 A | 1/1997 | Tata et al. | 700/120 |
| 6,021,358 A * | 2/2000 | Sachs | 700/98 |
| 6,429,861 B1 | 8/2002 | Hossack et al. | 345/419 |
| 6,627,835 B1 * | 9/2003 | Chung et al. | 219/69.12 |

FOREIGN PATENT DOCUMENTS

DE  100 04 918 A1   8/2001

OTHER PUBLICATIONS

Fellner, W.D.: "Computergrafik", 2., Vollständig überarbeitete und erweiterte Auflage, Reihe Informatik, Band 58, 1992, S.205-213, ISBN: 3-411-15122-6.
M.de Berg et al.: <<Computer Geometry, 2$^{nd}$ edition, Springer-Verlag 2000, Kapitel 11.2., Seiten 238 ff.
Hsu C. et al. Association for Computing Machinery: "A Constraint-Based Manipulator Toolset for Editing 3D Objects" Proceedings of the Fourth Symposium on solid Modeling and Applications Atlanta, GA, May 14-16, 1997, Proceedings of the Symposium on Solid Moedling and Applications, New York, ACM, US, Bd. Symp. 4, May 14, 1997, Seiten 168-180, XP000724303.
Abstract of Disclosure, p. 169, col., line 20-col., line 9, p. 173, col., line 54-col., line 27, p. 173, col., line 40-col., line 46, Drawing 8,9, Aug. 2001.

* cited by examiner

*Primary Examiner*—Phu K Nguyen
(74) *Attorney, Agent, or Firm*—Harness, Dickey & Pierce, P.L.C.

(57) ABSTRACT

A computer is provided with polyhedron corners. The computer uses the polyhedron corners to automatically determine the corresponding polyhedron edges and polyhedron areas and thus a closed polyhedron. The polyhedron corresponds to the selected portion of a volume. Only this selected portion is evaluated by the computer and is represented, in particular, by an output medium.

22 Claims, 6 Drawing Sheets

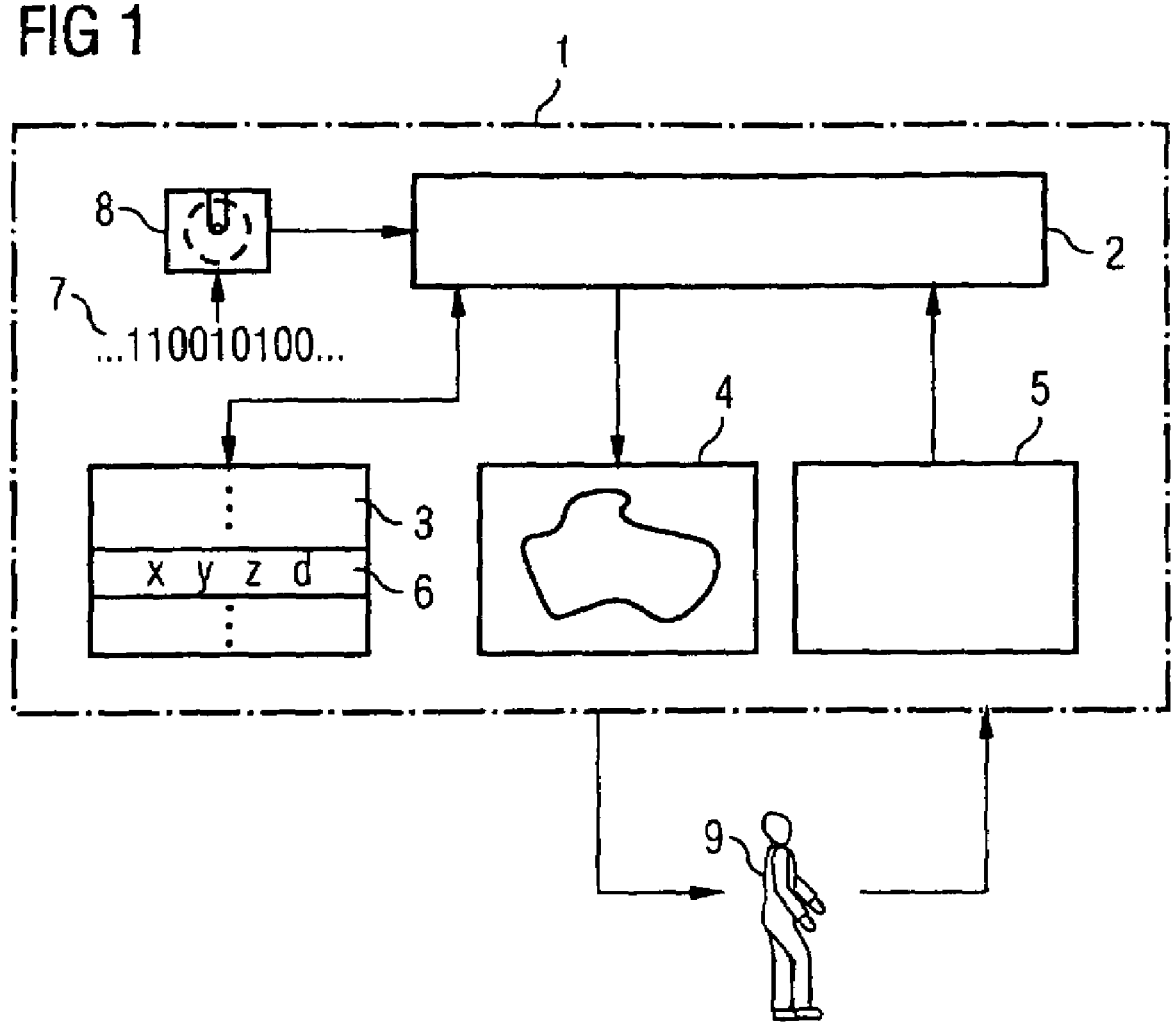

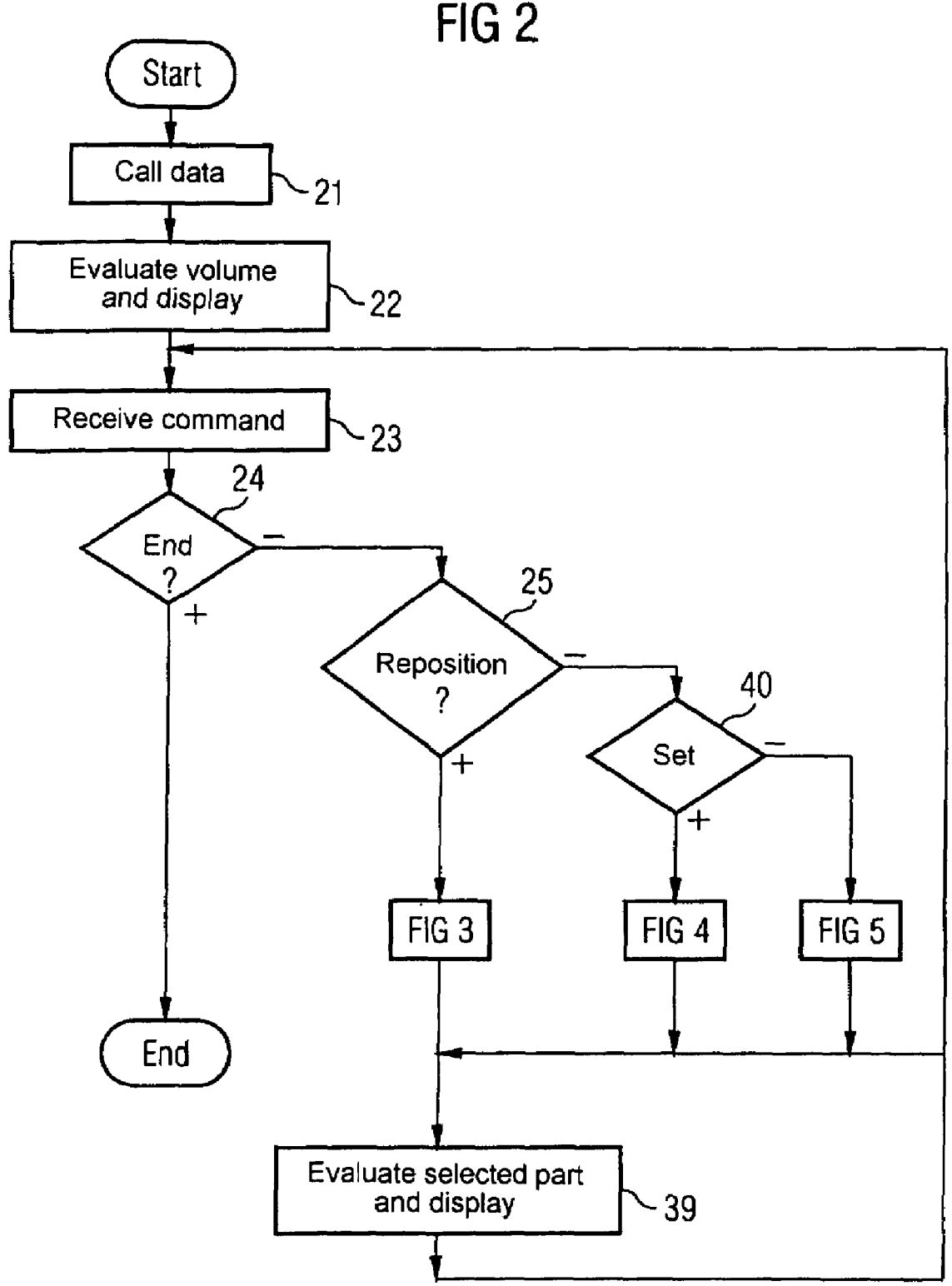

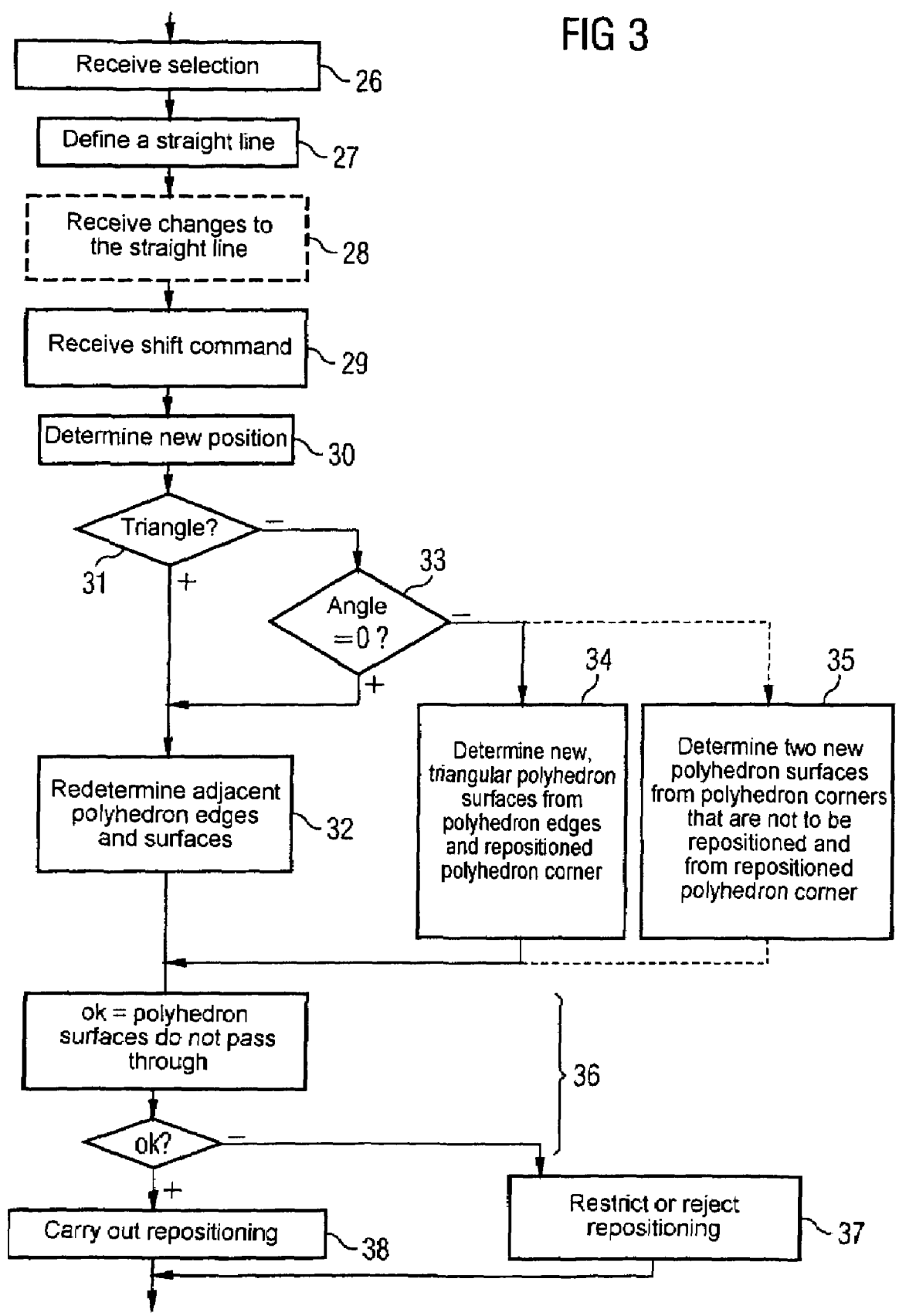

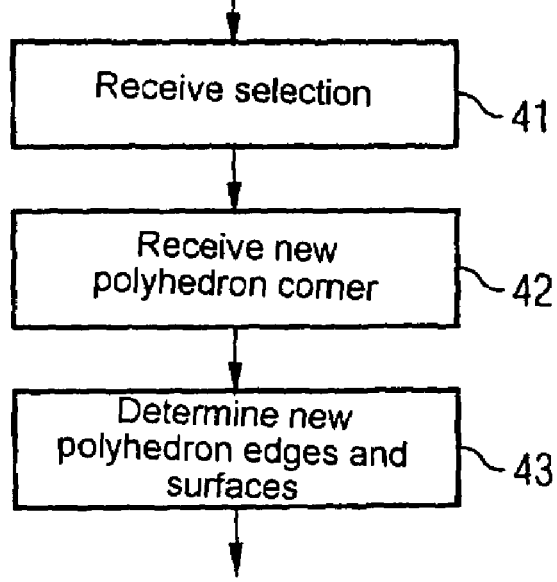
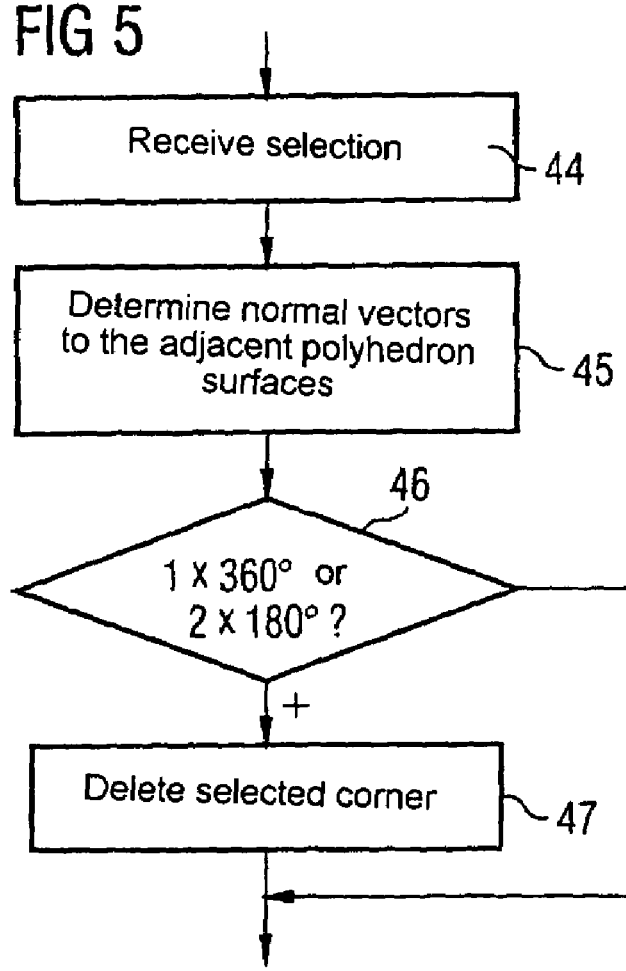

COMPUTER-AIDED SELECTION METHOD FOR A PORTION OF A VOLUME

This application is the national phase under 35 U.S.C. § 371 of PCT International Application No. PCT/EP2003/010306 which has an International filing date of Sep. 16, 2003, which designated the United States of America and which claims priority on German Patent Application number DE 102 42 922.7 filed Sep. 16, 2002, the entire contents of which are hereby incorporated herein by reference.

FIELD OF THE INVENTION

The present invention generally relates to a computer-aided selection method for a part of a volume. Particularly, it relates to one
wherein a computer evaluates only the selected part which, in particular, is displayed via an output medium
wherein the part is in the form of a polyhedron with polyhedron surfaces
wherein each polyhedron surface is bounded by polyhedron edges, and
wherein each polyhedron edge is bounded by polyhedron corners and bounds two, and only two, polyhedron surfaces.

BACKGROUND OF THE INVENTION

Selection methods are generally known. By way of example, reference is made to DE 100 04 918 A1. The selection methods is this reference are used in particular for the analysis of medical volume data records.

Volume data records generally define cuboids or cubes. Parts of the volume data record are in this case often not relevant for the user or even conceal a realistic impression of the relevant volume data since they contain disturbances (generally so-called artefacts). A volume element is thus defined in the prior art, and only this volume element is displayed. Simply shrinking the cuboid is in this case generally not sufficient to achieve the object, since the relevant volume data is often in a geometrically complex orientation.

In the prior art, it is known that the volume (or, which is the same thing, the volume data record) can be broken down with the aid of so-called section planes which may lie in any desired affine orientation, and for components thus to be masked out. In this case, before each section, on the one hand the planes must be positioned and on the other hand it is necessary to specify the side on which the volume data elements are located which are still intended to be displayed. The positioning of the section planes is generally complicated, since the orientation parameters must be defined by complicated combinations of mouse, joystick and/or keyboard.

SUMMARY OF THE INVENTION

An object of an embodiment of the present invention is to refine a computer-aided selection method such that the part of the volume can be selected in a simpler and better manner.

This object may be achieved
in that the polyhedron corners may be predetermined for the computer in order to determine the selected part, and
in that the polyhedron edges and polyhedron surfaces may be determined automatically by the computer on the basis of the predetermined polyhedron corners.

This is because the user in each case determines only a single point, instead of a plane. The other selection conditions then automatically follow from the predetermination of the polyhedron corner.

It is particularly advantageous for repositioning for one of the polyhedron corners to be predetermined for the computer by a user—preferably interactively, and for the polyhedron edges which contain the repositioned polyhedron corner and the polyhedron surfaces then to be redetermined by the computer in order to determine the selected part. This is because the selected part of the volume can then be varied dynamically.

It is possible for at least one of the polyhedron surfaces which contain the polyhedron corner to be repositioned to be in the form of a polygon with more than three polyhedron corners. In this case, two procedures are possible.

Firstly, it is possible for the computer to replace this polyhedron surface by polyhedron surfaces which are in the form of triangles, each of which contain a polyhedron edge, which is not bounded by the polyhedron corner to be repositioned, of the polygon as well as the repositioned polyhedron corner. Alternatively, it is also possible for the computer to replace this polyhedron surface by two polyhedron surfaces, in which case one is defined by the polyhedron corners of the polygon which are not to be repositioned, and the other is defined by those polyhedron corners of the polygon which are immediately adjacent to the polyhedron corner to be repositioned, and by the repositioned polyhedron corner.

In both cases, however, the subdivision of the polygon into more than one polyhedron surface is preferably carried out only when a vector from the polyhedron corner to be repositioned to the repositioned polyhedron corner forms an angle other than zero with the polygon.

When the repositioning of the polyhedron corner has been predetermined for the computer by the user shifting the polyhedron corner along a straight line which is defined before the repositioning of the polyhedron corner, the repositioning of the polyhedron corner is particularly simple. In this case, it is possible for the polyhedron corner to be repositioned to be selected by the user before the repositioning, and for the straight line to be automatically determined by the computer on the basis of the selected polyhedron corner. Alternatively, however, it is also possible for the straight line to be predetermined for the computer by the user before the repositioning of the polyhedron corner.

In some circumstances, it is possible for the polyhedron corners which exist at a specific time not to be sufficient to adequately describe the desired complexity of the part to be selected. The user can thus advantageously—preferably interactively—additionally predetermined new polyhedron corners for the computer. A new polyhedron corner is in this case predetermined, for example, by selection of a polyhedron edge or of a polyhedron surface, and by subsequently placing the new polyhedron corner within the selected polyhedron edge or polyhedron surface.

It is likewise possible to design more than the required number of polyhedron corners in order to select the desired part of the volume. It is thus preferably also possible for an unnecessary polyhedron corner to be deleted by the user—preferably interactively. In order also to uniquely define the selected volume, the deletion of the unnecessary polyhedron corner by the computer is preferably permitted only when the unnecessary polyhedron corner is a common polyhedron corner of at least two mutually adjacent polyhedron surfaces which lie on a common plane.

The user can also insert and delete polyhedron edges in a similar manner.

BRIEF DESCRIPTION OF THE DRAWINGS

Further advantages and details will become evident from the following description of an example embodiment in conjunction with the drawings in which, illustrated in outline form:

FIG. 1 shows a block diagram of a computer,
FIGS. 2 to 5 show flowcharts.

DETAILED DESCRIPTION OF THE EXEMPLARY EMBODIMENTS

Figure 6:
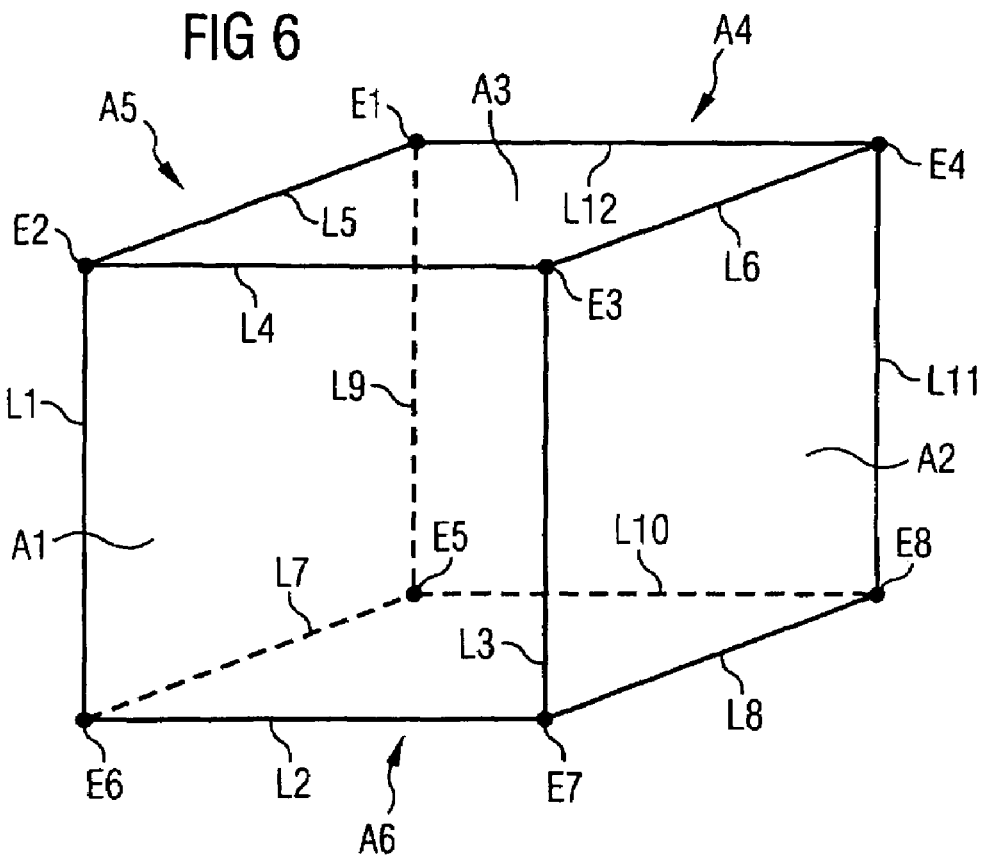
FIGS. 6 to 9 show schematic illustrations of selected parts of a volume.

According to FIG. 1, an example embodiment includes a computer 1 has a central processor unit 2, a memory 3, an output medium 4 and an input medium 5. The central processor unit 2 is a conventional main unit of a PC or the like. Data 6 from a volume data record is stored in the memory 3. Each data item 6 is generally associated with a position xyz in three dimensions, and with a volume data value d. The data items 6 generally define a cuboid volume, and mostly even a cubic volume.

The output medium 4 is a conventional output medium, by which a two-dimensional image can be displayed as required. Examples of output media 4 such as these are a monitor or a TFT display. The input medium 5 is also configured in a generally conventional manner and normally comprises a keyboard and a mouse, and possibly a joystick as an alternative or in addition to the mouse.

The central processor unit 2 is programmed with a digital control program 7 (computer program 7). The control program 7 thus corresponds to machine-legible digital control signals. The control program 7 is stored in a storage medium 8, for example a CD ROM or a floppy disc. On the basis of the programming with the control program 7, the computer 1 carries out a selection method for a part of the volume, which is defined by the volume data record. This selection method will be described in more detail in the following text in conjunction with FIGS. 2 to 9.

As already mentioned, the storage medium 8 is, by way of example, a floppy disc 8, a set of floppy discs 8 or a CD ROM or the like. It thus represents a data storage medium 8 in which a machine-legible digital program code 7 is stored, specifically the control program 7 which interacts with the computer 1 in such a way that the selection method according to an embodiment of the invention is carried out.

As shown in FIG. 2, the data 6 is first of all called from the memory 3 in a step 21 in the course of the selection method according to an embodiment of the invention. The data 6 is then evaluated by the computer 1 in a step 22. The evaluation result is displayed by the computer 1 on the output medium 4.

This initial state is illustrated schematically in FIG. 6. The entire volume is still selected in this stage. This is generally in the form of a cuboid, and mostly even in the specific form of a cube. However, it may also have a different shape.

Even in this initial state, the volume (or the selected part of the volume) is, however, in the form of a closed polyhedron. As is shown in FIG. 6, the polyhedron has polyhedron surfaces A1 to A6. The polyhedron surfaces A1 to A6 are planar surfaces which are bounded by straight polyhedron edges L1 to L12. In the present case of a cuboid or a cube, each polyhedron surface A1 to A6 is in this case bounded by four polyhedron edges L1 to L12. The minimum number of polyhedron edges L1 to L12 per polyhedron surface A1 to A6 is, however, three. Furthermore, each polyhedron edge L1 to L12 is always bounded by two polyhedron corners E1 to E8 and itself bounds two, and only two, polyhedron surfaces A1 to A6.

Once the volume has been displayed in the step 22, the computer 1 receives a command in a step 23. In the step 24, the computer checks whether the selection method should be ended. The computer 1 jumps to a step 25 only if this is not the case.

In the step 25, the computer 1 checks whether a repositioning command has been predetermined for it in the step 23. In this case, a user 9 wishes to reposition an already existing polyhedron corner E1 to E8 via the input medium 5.

If it is intended to reposition a polyhedron corner E1 to E8, the computer 1 first of all receives a selection of (at least) one of the polyhedron corners E1 to E8, for example the polyhedron corner E4 in a step 26, as shown in FIG. 3. In a step 27, it then defines a straight line 10, along which the selected polyhedron corner E4 is intended to be shifted.

The straight line 10 can be defined in many ways. For example, the direction of the straight lines 10 can be defined by the sum of the normal vectors of the adjacent polyhedron surfaces A2 to A4. If required, the normal vectors could also be weighted with the area measures of the surfaces A2 to A4 with respect to which they are defined. The straight line 10 can also, for example, be aligned with the centroid of the already selected part of the volume or with the polyhedron corner which is furthest away from it, in this case the polyhedron corner E6. Any desired combinations of the direction vectors defined in this way are also possible.

As can be seen from FIG. 3, the direction of the straight lines 10 cannot be varied by the user 9. The straight line 10 is thus automatically determined by the computer 1 on the basis of the selected polyhedron corner E4. However, it would also be possible, as is indicated by a direction cross 11 in FIG. 7, for the direction of the straight line 10 to be predetermined for the computer 10 by the user 9 by way of appropriate inputs—preferably interactively. This is indicated by a dashed step 28 in FIG. 3.

Once the straight line 10 has been defined, irrespective of whether this is done by the computer 1 or by the user 9, the computer 1 receives a shift command in a step 29 for the selected polyhedron corner E4 to be repositioned. The polyhedron corner E4 is thus shifted along the straight line 10 by the computer 1. The position is redetermined by the computer 1 in a step 30—preferably continuously.

However, in principle, a different type of position preset would also be feasible. For example, the polyhedron corner E4 to be repositioned could be clicked on with the mouse, and could be shifted along the straight lines 10 or within a previously defined plane. Direct coordinate presetting by way of the keyboard would also be feasible. The repositioned polyhedron corner, which is referred to in the following text as E4' in order to distinguish between it and the polyhedron corner E4 to be repositioned, is illustrated by way of example in FIGS. 7 and 8.

In a step 31, the computer 1 checks for each polyhedron surface A2 to A4 which is adjacent to the polyhedron corner E4 to be repositioned whether this surface is a triangle. If this is the case, the process continues with a step 32. In the step 32, the computer 1 redetermines with respect to the respective polyhedron surface those polyhedron edges which are adjacent to the polyhedron corner E4 to be repositioned and/or to the repositioned polyhedron corner E4', as well as the polyhedron surfaces which are bounded by them.

In the present case, those polyhedron surfaces A2 to A4 which are adjacent to the polyhedron corner E4 to be repositioned are, however, polygons with more than three polyhedron corners. This is because each of the polyhedron surfaces A2 to A4 is in the form of a quadrilateral with four polyhedron corners E1 to E4 as well as E1, E4, E5 and E8, and E3, E4, E7 and E8. The computer 1 thus jumps from the step 31 to a step 33 for each polyhedron surface A2 to A4.

In the step 33, a check is carried out for each polyhedron surface A2 to A4 which is adjacent to the polyhedron corner E4 to be repositioned to determine whether a vector V from the polyhedron corner E4 to be repositioned to the repositioned polyhedron corner E4' in each case forms an angle other than zero with the adjacent polygons A2 to A4. This is because the polygon A3 could remain if the polyhedron corner E4 were, for example, to be repositioned within the plane indicated by dashed lines in FIG. 7. In this case, it would be possible to continue with the step 32 for this polyhedron surface A3.

Figure 8:
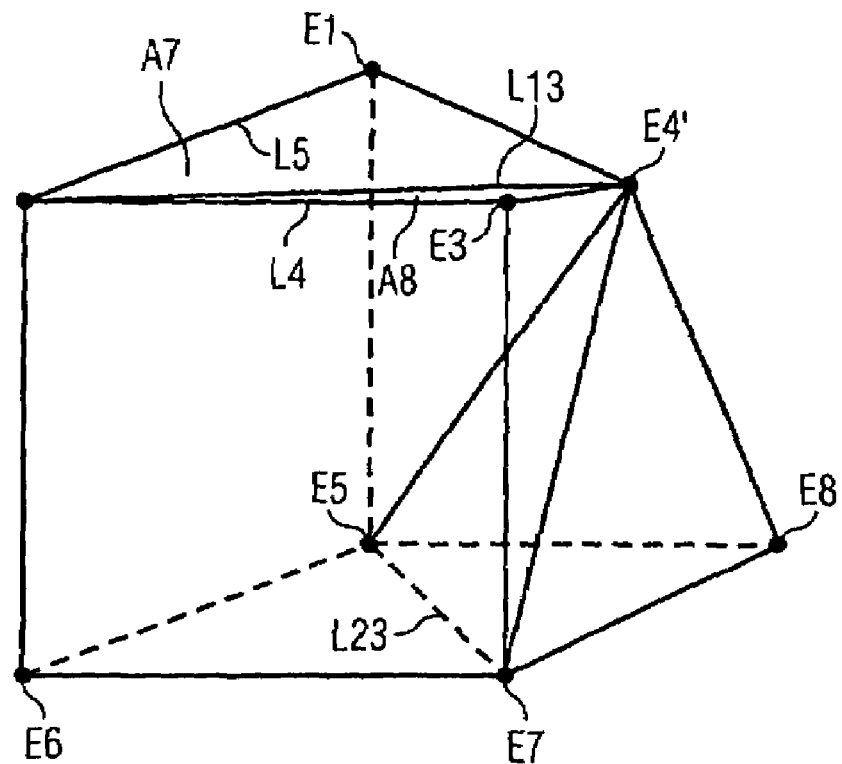

If, in contrast, the check in the step 33 shows that the angle is not zero, a step 34 is carried out. In this step 34, the computer 1 replaces the original polygon A3, e.g. by new polyhedron surfaces A7, A8. These new polyhedron surfaces A7, A8 are illustrated in FIG. 8. As can be seen, these polyhedron surfaces A7, A8 are in the form of triangles and each contain a polyhedron edge L4, L5 of the polygon A3 which is not bounded by the polyhedron corner E4 to be repositioned, as well as the repositioned polyhedron corner E4'. The computer 1 thus at the same time determines a new, additional polyhedron edge L13.

Figure 7:
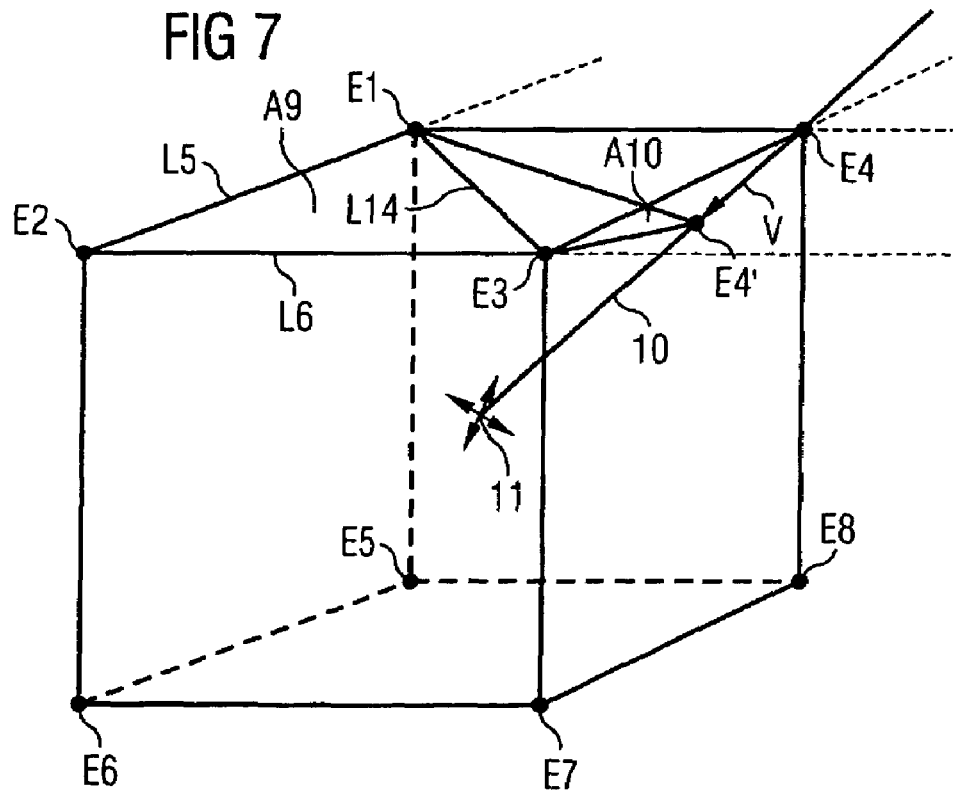

As an alternative to carrying out the step 34, it would also be possible for the computer 1 to replace the polyhedron surface A3 by only two polyhedron surfaces A9, A10 in a step 35. As is shown in FIG. 7, the first polyhedron surface A9 is in this case defined by those polyhedron corners E1 to E3 of the polygon A3 which are not intended to be repositioned. The other polyhedron surface A10 is defined by the polyhedron corners E1, E3, which are immediately adjacent to the polyhedron corner E4 to be repositioned, as well as the repositioned polyhedron corner E4'. In this case as well, the computer 1 determines an additional polyhedron edge L14.

The procedure described above in conjunction with the polyhedron surface A3 and in accordance with the steps 31 to 35 is carried out in the same way for the other polyhedron surfaces A2, A4 which are adjacent to the polyhedron corner E4 to be repositioned.

Once the polyhedron edges and polyhedron surfaces have been redetermined, the computer 1 checks in a step 36 whether the polyhedron surfaces A1 to A10 pass through one another. If this is the case, the repositioning of the selected polyhedron corner E4 is rejected by the computer 1 in a step 37. Alternatively —particularly if the steps 30 to 35 are carried out continuously—the repositioning can be limited to a value at which the polyhedron surfaces A1 to A10 do not pass through one another but are only adjacent. When the polyhedron edges and surfaces do not pass through one another, the repositioning is carried out in a step 38.

After this redefinition, the newly selected part of the volume is reevaluated by the computer 1 in a step 39, and the evaluation result is displayed via the output medium 4. Therefore the result of this is that the user 9 interactively predetermines only the polyhedron corners E1 to E8 for the computer 1. The polyhedron edges L1 to L14 and the polyhedron surfaces A1 to A10 are determined automatically by the computer 1 on the basis of the predetermined polyhedron corners E1 to E8. However, the polyhedron defines the selected part of the volume at all times.

In addition, it should be noted that, when the polyhedron corners E1 to E8 are initially predetermined, that is to say when the polyhedron edges L1 to L12 and the polyhedron surfaces A1 to A6 are not yet known to the computer 1, the selected part of the volume can be determined as the convex envelope of the predetermined polyhedron corners E1 to E8. Methods for determination of the convex envelope are described, for example, in M. de Berg et al.: Computer Geometry, 2nd Edition, Springer-Verlag 2000, Section 11.2, pages 238 et seq, the entire contents of which are hereby incorporated herein by reference.

If any polyhedron corners which have been predetermined in this initial state may lie within the selected part, these polyhedron corners are preferably automatically deleted by the computer 1. Polyhedron corners which are located at the edge of the selected part and can be deleted without any change to the selected part are preferably likewise deleted. The same applies to polyhedron edges which have been determined if these may lie within or at the edge of the selected part.

If it has been found in the step 25 that an existing polyhedron corner E1 to E8 is not intended to be repositioned, the computer 1 jumps to a step 40, as shown in FIG. 2, where a check is carried out to determine whether a polyhedron corner should be reset.

Even when a new polyhedron corner is additionally intended to be predetermined, the user 9 can do this interactively. As is shown in FIG. 4, the user 9 preferably selects an already existing polyhedron surface for this purpose, by way of example the polyhedron surface A2 shown in FIG. 9, in a step 41. In a step 42 the user 9 then sets the new polyhedron corner E9. In a step 43, the computer 1 then automatically determines new polyhedron edges L15 to L18 as well as new polyhedron surfaces A11 to A14.

new polyhedron edges L15 to L18 are in this case defined by in each case one of the polyhedron corners E3, E4, E7, E8 of the selected polyhedron surface A2 and the newly predetermined polyhedron corner E9. The new polyhedron surfaces A11 to A14 are defined by in each case one of the polyhedron edges L3, L6, L8, L11 of the selected polyhedron surface A2 and the nearly predetermined polyhedron corner E9.

Figure 9:
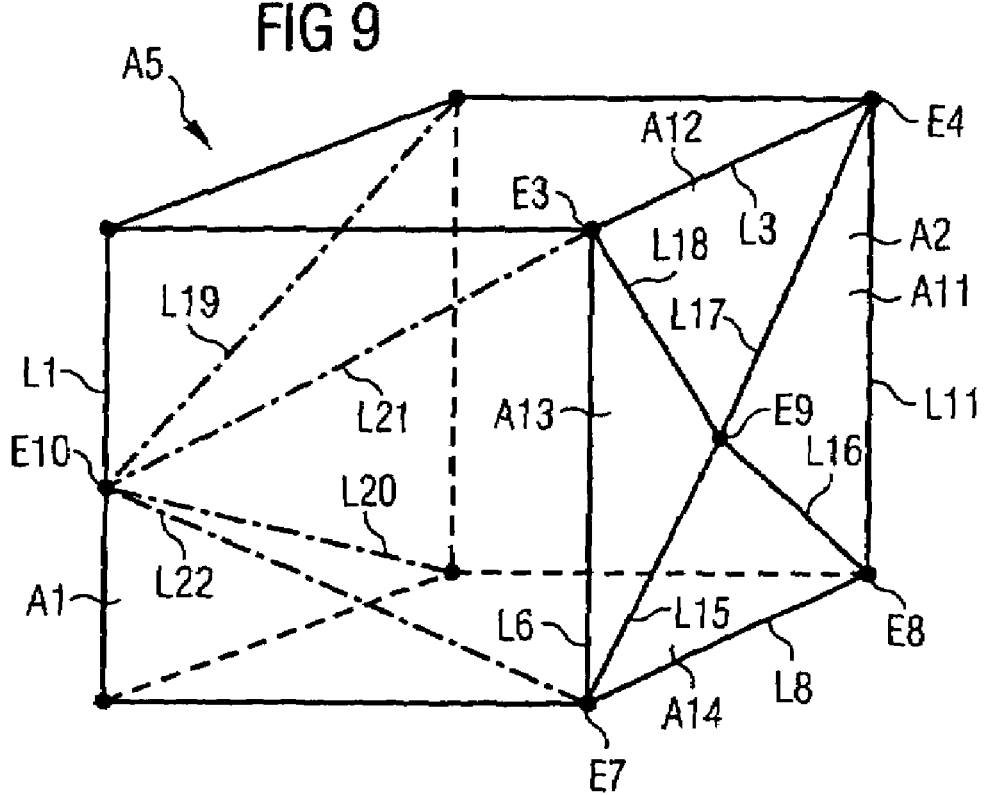

It would also be possible in an analogous manner to select a polyhedron edge, for example the polyhedron edge L1 as shown in FIG. 9, in the step 41. In this case, a new polyhedron corner E10 could be placed within this polyhedron edge L1 in the step 42. In this case, both polyhedron surfaces A1, A5 which are adjacent to the polyhedron edge L1 would automatically be subdivided into triangles by the computer 1 by the introduction of additional polyhedron edges L19 to L22. The additional polyhedron edges L19 to L22 are shown by dashed-dotted lines in FIG. 9.

In a similar manner, in the case of a polygon, by way of example the polyhedron surface A6 shown in FIG. 8, two polyhedron corners which are not immediately adjacent to one another, for example the polyhedron corners E5 and E7 as shown in FIG. 8, also can be selected. This allows a further polyhedron edge L23, which is shown by dashed-dotted lines in FIG. 8, to be inserted deliberately.

If the setting of a new polyhedron corner E9, E10 has not been found in the step 40, only one polyhedron corner E1 to E10 can still be deleted. This can also be predetermined interactively by the user 9.

In this case, as is shown in FIG. 5, the computer 1 receives a selection command for the polyhedron corner to be deleted (that is to say the unnecessary polyhedron corner), for example the polyhedron corner E9 or E10, from the user 9 in a step 44. In a step 45, the computer 1 determines the normal vectors of all the polyhedron surfaces which are adjacent to the polyhedron corner E9 or E10 to be deleted, for example the polyhedron surfaces A11 to A14. In a step 46, the computer 1 then checks whether the normal vectors are either all parallel or else parallel to one another in cohesive subareas of 180° each. The first-mentioned case represents the inverse case to the setting of the polyhedron corner E9, while the second case represents the inverse case to the setting of the polyhedron corner E10. The computer 1 carries out a deletion process for the selected polyhedron corner E9 or E10 in a step 47 only in these two cases. Otherwise, this process is rejected.

It is also possible to delete polyhedron corners E1 to E10 even though they are not redundant. In this case, a new polyhedron can be determined, for example by way of triangulation methods which are known per se, for those polyhedron corners which are immediately adjacent to the polyhedron corner to be deleted. Triangulation methods are described, for example, in Edelsbrunner, H.: Geometry and Topology for Mesh Generation, Cambridge University Press 2001, the entire contents of which are hereby incorporated herein by reference. As an alternative to the use of triangulation methods, the convex envelope of the polyhedron could also be determined locally for those polyhedron corners which are immediately adjacent to the polyhedron corner to be deleted.

In a similar manner, it is also possible to check whether the two polyhedron surfaces, for example the polyhedron surfaces A12 and A13, which are adjacent to a selected polyhedron edge, for example the polyhedron edge L18, lie on a common plane. In this case, deletion of the polyhedron edge L18 is permissible.

The selection method according to an embodiment of the invention thus dispenses with section planes as such and their positioning. Instead of this, polyhedron corners E1 to E10, E4' are predetermined and positioned. In this case, the polyhedron corners E1 to E10, E4' can be positioned both individually and in groups (for example by selection and shifting of a polyhedron edge L1 to L23, or a polyhedron-surface A1 to A14). The selection method according to an embodiment of the invention can thus be carried out in a considerably simpler and more convenient manner than the selection methods according to the prior art, which use section planes. Furthermore, by way of the positioning of the polyhedron corners E1 to E10, E4', it is also possible to select the part in such a way that it is not convex, that is to say it is locally concave. In principle, this is not possible in the case of selection by way of section planes.

Finally, it should also be mentioned that it is also possible to rotate the selected part of the volume and/or to stretch it centrally. The rotation axis or the fixing point for central stretching may in this case be predetermined, for example, by the user 9—preferably interactively. Alternatively, the rotation axis or the fixing point can also be determined by the computer. By way of example, the fixing point for the central stretching may be the centroid of the selected part of the volume. The rotation axis may, for example, include the centroid of the selected part of the volume and may run parallel to one of the coordinate axes of the coordinate system. Other calculation methods for the fixing point and for the rotation axis are also possible. It is even possible to predetermine the fixing point and/or the rotation axis such that it or they are fixed.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A computer-aided selection method for a part of a volume, comprising:
    evaluating, using a computer, only a selected part of the volume,
    wherein the selected part is in the form of a polyhedron with polyhedron surfaces, with each polyhedron surface being bounded by polyhedron edges and with each polyhedron edge being bounded by polyhedron corners bounding only two polyhedron surfaces,
    wherein the polyhedron corners are for the computer in order to determine the selected part,
    wherein the polyhedron edges and polyhedron surfaces are determined automatically by the computer on the basis of the polyhedron corners,
    wherein a user determines repositioning for one of the polyhedron corners for the computer,
    wherein the computer then redetermines those polyhedron edges and polyhedron surfaces which contain the repositioned polyhedron corner in order to determine the selected part,
    wherein at least one of the polyhedron surfaces which contain the polyhedron corner to be repositioned is in the form of a polygon with more than three polyhedron corners, and
    wherein the at least one polyhedron surface is replaced by the computer by polyhedron surfaces which are in the form of triangles, each containing one polyhedron edge which is not bounded by the polyhedron corner to be repositioned of the polygon as well as the repositioned polyhedron corner.

2. The selection method as claimed in claim 1, wherein the method as claimed in claim 3 is carried out only when a vector from the polyhedron corner to be repositioned to the repositioned polyhedron corner forms an angle other than zero with the polygon.

3. The selection method as claimed in claim 1, wherein the repositioning of the polyhedron corner is determined for the computer by the user shifting the polyhedron corner along a straight line which is defined before the repositioning of the polyhedron corner.

4. The selection method as claimed in claim 3, wherein the polyhedron corner to be repositioned is selected by the user before the repositioning, and wherein the straight line is automatically determined by the computer on the basis of the selected polyhedron corner.

5. The selection method as claimed in claim 3, wherein the straight line is determined for the computer by the user before the repositioning of the polyhedron corner.

6. The selection method as claimed in claim 1, wherein a new polyhedron corner is additionally determined for the computer by the user.

7. The selection method as claimed in claim 6, wherein the new polyhedron corner is determined by selection of at least one of a polyhedron edge a polyhedron surface, and by subsequently placing the new polyhedron corner within the at least one of the selected polyhedron edge and polyhedron surface.

8. The selection method as claimed in claim 1, wherein an unnecessary polyhedron corner is deleted by the user.

9. The selection method as claimed in claim 8, wherein the deletion of the unnecessary polyhedron corner by the computer is permitted only when the unnecessary polyhedron corner is a common polyhedron corner of at least two mutually adjacent polyhedron surfaces which lie on a common plane.

10. The selection method as claimed in claim 1, wherein at least one of the polyhedron surfaces which contain the polyhedron corner to be repositioned is a polygon with more than three polyhedron corners, and wherein the user inserts an additional polyhedron edge which is bounded by two polyhedron corners, which were previously not immediately adjacent, of the polygon.

11. The selection method as claimed in claim 10, wherein an unnecessary polyhedron edge is deleted by the user.

12. The selection method as claimed in claim 11, wherein the deletion of the unnecessary polyhedron edge by the computer is permitted only when the polyhedron surfaces which are adjacent to the unnecessary polyhedron edge lie on a common plane.

13. The selection method as claimed in claim 10, wherein an unnecessary polyhedron edge is deleted by the user interactively.

14. A computer storage medium encoded with a computer program, which interacts with a computer in such a way that, when executed by the computer, results in a selection method as claimed in claim 1.

15. A computer program product having a computer storage medium storing program code, the program code executed by a computer for carrying out a selection method as claimed in claim 1.

16. A computer storage medium in which computer codes are stored, the computer codes are executed by a computer to perform a selection method as claimed in claim 1.

17. A computer which is programmed to carry out the claimed selection method in claim 1.

18. The method of claim 1, further comprising: displaying the selected part of the volume via an output medium.

19. The selection method as claimed in claim 1, wherein the selection method is carried out only when a vector from the polyhedron corner to be repositioned to the repositioned polyhedron corner forms an angle other than zero with the polygon.

20. The selection method as claimed in claim 1, wherein a new polyhedron corner is additionally determined for the computer interactively by the user.

21. The selection method as claimed in claim 1, wherein an unnecessary polyhedron corner is deleted by the user interactively.

22. A computer-aided selection method for a part of a volume, comprising:

evaluating, using a computer, only a selected part of the volume, wherein the selected part is in the form of a polyhedron with polyhedron surfaces, with each polyhedron surface being bounded by polyhedron edges and with each polyhedron edge being bounded by polyhedron corners bounding only two polyhedron surfaces, wherein the polyhedron corners are for the computer in order to determine the selected part, wherein the polyhedron edges and polyhedron surfaces are determined automatically by the computer on the basis of the polyhedron corners, wherein a user determines repositioning for one of the polyhedron corners for the computer, wherein the computer then redetermines those polyhedron edges and polyhedron surfaces which contain the repositioned polyhedron corner in order to determine the selected part, wherein at least one of the polyhedron surfaces which contain the polyhedron corner to be repositioned is a polygon with more than three polyhedron corners, wherein the at least one polyhedron surface is replaced by the computer by two polyhedron surfaces, and wherein one of the two polyhedron surfaces is defined by the polyhedron corners of the polygon which are not to be repositioned, and an other of the two polyhedron surfaces is defined by those polyhedron corners of the polygons which are immediately adjacent to the polyhedron corner to be repositioned, and by the repositioned polyhedron corner.

* * * * *